(12) United States Patent
Wu et al.

(10) Patent No.: US 11,048,914 B2
(45) Date of Patent: Jun. 29, 2021

(54) FACE ANTI-COUNTERFEITING DETECTION METHODS AND SYSTEMS, ELECTRONIC DEVICES, PROGRAMS AND MEDIA

(71) Applicant: BEIJING SENSETIME TECHNOLOGY DEVELOPMENT CO., LTD, Beijing (CN)

(72) Inventors: Liwei Wu, Beijing (CN); Tianpeng Bao, Beijing (CN); Meng Yu, Beijing (CN); Yinghui Che, Beijing (CN); Chenxu Zhao, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 38 days.

(21) Appl. No.: 16/451,208

(22) Filed: Jun. 25, 2019

(65) Prior Publication Data
US 2019/0318156 A1    Oct. 17, 2019

Related U.S. Application Data

(63) Continuation of application No. PCT/CN2018/079247, filed on Mar. 16, 2018.

(30) Foreign Application Priority Data

Mar. 16, 2017    (CN) .......................... 201710157715.1
Dec. 1, 2017    (CN) .......................... 201711251762.9

(51) Int. Cl.
*G06K 9/00*    (2006.01)
*G06K 9/66*    (2006.01)

(52) U.S. Cl.
CPC ..... *G06K 9/00268* (2013.01); *G06K 9/00288* (2013.01); *G06K 9/66* (2013.01)

(58) Field of Classification Search
None
See application file for complete search history.

(56) References Cited

U.S. PATENT DOCUMENTS

| 10,664,722 B1* | 5/2020 | Sharma | G06Q 30/0641 |
| 2013/0188840 A1* | 7/2013 | Ma | G06K 9/00261 |
| | | | 382/107 |
| 2013/0342702 A1* | 12/2013 | Zhang | G06K 9/2018 |
| | | | 348/164 |
| 2014/0270412 A1 | 9/2014 | Ma et al. | |
| 2015/0178617 A1* | 6/2015 | Canoy | G06N 3/049 |
| | | | 706/25 |

(Continued)

FOREIGN PATENT DOCUMENTS

| CN | 102622588 A | 8/2012 |
| CN | 102696036 A | 9/2012 |

(Continued)

OTHER PUBLICATIONS

First Office Action of the Chinese application No. 201711251762.9, dated Dec. 4, 2019.

(Continued)

*Primary Examiner* — Hadi Akhavannik
(74) *Attorney, Agent, or Firm* — Syncoda LLC; Feng Ma

(57) ABSTRACT

Face anti-counterfeiting detection methods and systems, electronic devices, and computer storage media include: obtaining an image or video to be detected containing a face; extracting a feature of the image or video to be detected, and detecting whether the extracted feature contains counterfeited face clue information; and determining whether the face passes the face anti-counterfeiting detection according to a detection result.

20 Claims, 9 Drawing Sheets

(56) References Cited

U.S. PATENT DOCUMENTS

| | | | | |
|---|---|---|---|---|
| 2015/0339571 A1* | 11/2015 | Krizhevsky | .......... | G06K 9/4628 |
| | | | | 382/158 |
| 2016/0005050 A1* | 1/2016 | Teman | ................ | G06Q 30/018 |
| | | | | 705/317 |
| 2016/0224853 A1* | 8/2016 | Xiong | ................ | G06K 9/00228 |
| 2017/0024641 A1* | 1/2017 | Wierzynski | .......... | G06N 3/0454 |
| 2018/0032828 A1* | 2/2018 | Wang | ................ | G06K 9/00288 |
| 2018/0060648 A1* | 3/2018 | Yoo | .................... | G06K 9/00899 |
| 2018/0276488 A1* | 9/2018 | Yoo | .................... | G06K 9/00228 |
| 2018/0285628 A1* | 10/2018 | Son | .................... | G06K 9/00281 |

FOREIGN PATENT DOCUMENTS

| | | | |
|---|---|---|---|
| CN | 103886301 | A | 6/2014 |
| CN | 105023005 | A | 11/2015 |
| CN | 105205455 | A | 12/2015 |
| CN | 105354557 | A | 2/2016 |
| CN | 105447432 | A | 3/2016 |
| CN | 105513221 | A | 4/2016 |
| CN | 105612533 | A | 5/2016 |

OTHER PUBLICATIONS

Xiao Xu, Research on Deep Learning Based Face Lineness Detection Algorithm, mailed Mar. 15, 2017.
International Search Report in the international application No. PCT/CN2018/079247, dated Apr. 23, 2018.
English translation of the Written Opinion of the International Search Authority in the international application No. PCT/CN2018/079247, dated Apr. 23, 2018.

* cited by examiner

FACE ANTI-COUNTERFEITING DETECTION METHODS AND SYSTEMS, ELECTRONIC DEVICES, PROGRAMS AND MEDIA

CROSS-REFERENCE TO RELATED APPLICATIONS

This is a continuation application of International Patent Application No. PCT/CN2018/079247, filed on Mar. 16, 2018, which claims priority to Chinese Patent Application No. CN201710157715.1 filed on Mar. 16, 2017, and Chinese Patent Application No. CN201711251762.9 filed on Dec. 1, 2017. The disclosures of these applications are incorporated by reference in their entirety.

TECHNICAL FIELD

The present disclosure relates to computer vision technologies, and in particular, to face anti-counterfeiting detection methods and systems, electronic devices, programs and media.

BACKGROUND

Living body detection refers to determining whether a facial image in front of a camera is from a real person by using the computer vision technology. There are generally two implementation ideas for living body detection, i.e., face activity detection and face anti-counterfeiting detection. The two ideas have different emphases. The face anti-counterfeiting detection focuses on detecting whether the face is authentic, and the face activity detection focuses on detecting whether the face is active. The face having activity is not necessarily a non-counterfeited face. Similarly, a non-counterfeited face is not necessarily active.

SUMMARY

Embodiments of the present disclosure provide a technical solution for face anti-counterfeiting detection.

According to one aspect of the embodiments of the present disclosure, provided is a face anti-counterfeiting detection method. The method includes: obtaining an image or video to be detected containing a face; extracting a feature of the image or video to be detected, and detecting whether the extracted feature contains counterfeited face clue information; and determining whether the face passes the face anti-counterfeiting detection according to a detection result.

According to another aspect of the embodiments of the present disclosure, provided is a face anti-counterfeiting detection system. The system includes: a first obtaining module configured to obtain an image or video to be detected containing a face; an anti-counterfeiting detection module configured to extract a feature of the image or video to be detected, and detect whether the extracted feature contains counterfeited face clue information; and a determining module configured to determine whether the face passes the face anti-counterfeiting detection according to a detection result.

According to still another aspect of the embodiments of the present disclosure, provided is an electronic device. The electronic device includes the face anti-counterfeiting detection system according to any one of the foregoing embodiments of the present disclosure.

According to still another aspect of the embodiments of the present disclosure, provided is another electronic device. The electronic device includes: a memory configured to store executable instructions; and a processor configured to communicate with the memory to execute the executable instructions so as to perform the following operations: obtaining an image or video to be detected containing a face; extracting a feature of the image or video to be detected, and detecting whether the extracted feature contains counterfeited face clue information; and determining whether the face passes the face anti-counterfeiting detection according to a detection result.

According to yet another aspect of the embodiments of the present disclosure, provided is a computer program, including a computer-readable code, where when the computer-readable code runs in a device, a processor in the device executes instructions for implementing steps of the method according to any one of the embodiments of the present disclosure.

According to yet another aspect of the embodiments of the present disclosure, provided is non-transitory computer-readable storage medium configured to store computer-readable instructions, wherein execution of the instructions by the processor causes the processor to perform the following operations: obtaining an image or video to be detected containing a face; extracting a feature of the image or video to be detected, and detecting whether the extracted feature contains counterfeited face clue information; and determining whether the face passes the face anti-counterfeiting detection according to a detection result.

Based on the face anti-counterfeiting detection methods and systems, electronic devices, programs and media provided by the foregoing embodiments of the present disclosure, after an image or video to be detected containing a face is obtained, a feature of the image or video to be detected is extracted, and whether the extracted feature contains counterfeited face clue information is detected, and whether the image or video to be detected passes the face anti-counterfeiting detection is determined according to a detection result. The embodiments of the present disclosure can achieve effective face anti-counterfeiting detection without relying on special multi-spectral devices. Since no special hardware device is required, the hardware cost is reduced, and it is convenient to be applied to various face detection scenarios.

The following further describes in detail the technical solutions of the present disclosure with reference to the accompanying drawings and embodiments.

BRIEF DESCRIPTION OF THE DRAWINGS

The accompanying drawings constituting a part of the specification describe embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
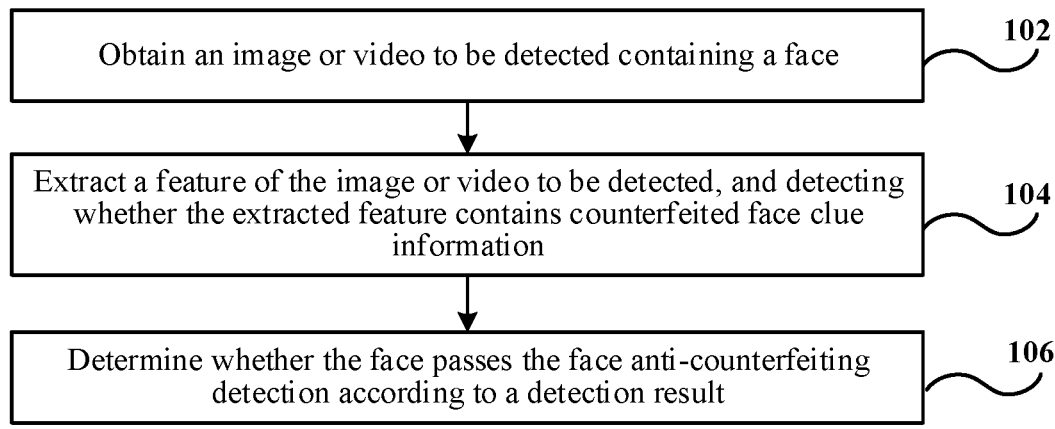
FIG. 1 illustrates a flowchart of an embodiment of a face anti-counterfeiting detection method according to the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to an electronic device such as a computer system/server, which may operate with numerous other general-purpose or special-purpose computing system environments or configurations. Examples of well-known computing systems, environments, and/or configurations suitable for use together with the electronic devices such as the computer systems/servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as the computer systems/servers may be described in the general context of computer system executable instructions (for example, program modules) executed by the computer systems. Generally, the program modules may include routines, programs, target programs, assemblies, logics, data structures, and the like, to perform specific tasks or implement specific abstract data types. The electronic devices such as the computer systems/servers may be practiced in the distributed cloud computing environments in which tasks are executed by remote processing devices that are linked through a communications network. In the distributed computing environments, the program modules may be located in local or remote computing system storage media including storage devices.

FIG. 1 is a flowchart of an embodiment of a face anti-counterfeiting detection method according to the present disclosure. As shown in FIG. 1, the face anti-counterfeiting detection method of this embodiment includes:

102. An image or video to be detected containing a face is obtained.

In an optional example, the operation 102 may be performed by a processor by invoking a corresponding instruction stored in a memory, or may be performed by a first obtaining module run by the processor.

104. A feature of the image or video to be detected is extracted, and whether the extracted feature contains counterfeited face clue information is detected.

In an optional example of the embodiments of the present disclosure, the feature extracted in the embodiments of the present disclosure, for example, includes but not limited to any one of the following: a Local Binary Pattern (LBP) feature, a Histogram of Sparse Coding (HSC) feature, a panorama (LARGE) feature, a face map (SMALL) feature, and a face detail map (TINY) feature. In some application, feature items included in the extracted feature are updated according to possible counterfeited face clue information.

Edge information in the image is highlighted by means of the LBP feature. The reflection and fuzzy information in the image is reflected more clearly by means of the HSC feature. The LARGE feature is a panorama feature, and the most obvious counterfeited hack in the image is extracted based on the LARGE feature. The face map (SMALL) is a region cut map having the size multiple (for example, 1.5 times the size) a face frame in an image, and includes a face and a portion where the face corresponds to a background. The counterfeited hacks such as reflection, a screen Moiré pattern of a copying device, and the edge of a model or mask are extracted based on the SMALL feature. The face detail map (TINY) is a region cut map having the size of the face frame, including a face. The counterfeited hacks such as the image PS (edited based on the image editing software photoshop), the screen Moiré pattern of the copying device, and the texture of the model or mask are extracted based on the TINY feature.

In an optional example of the embodiments of the present disclosure, the counterfeited face clue information in the embodiments of the present disclosure has human eye observability under a visible light condition, that is, the human eye can see the counterfeited face clue information under the visible light condition. Based on the characteristics of the counterfeited face clue information, it is possible to achieve anti-counterfeiting detection by means of static images or dynamic videos collected by a visible light camera (such as an RGB camera), which avoids additionally introducing special cameras, thereby reducing the hardware cost. The counterfeited face clue information includes but not limited to one or more of the following: counterfeited clue information of an imaging medium, counterfeited clue information of an imaging media, and clue information of a real counterfeited face. The counterfeited clue information of the imaging medium is also known as 2D counterfeited face clue information, the counterfeited clue information of the imaging media is also known as 2.5D counterfeited face clue information, and clue information of the real counterfeited face is also known as 3D counterfeited face clue information, and therefore, the counterfeited face clue information to be detected is correspondingly updated according to possible counterfeited face modes. The clue information is detected, so that the electronic device can "discover" the boundaries between various real faces and counterfeited faces, and realize various types of anti-counterfeiting detection under the condition of general hardware devices such as visible light cameras, thereby resisting the "hack" attack and improving security.

The counterfeited clue information of the imaging medium includes but not limited to edge information, reflection information, and/or material information of the imaging medium. The counterfeited clue information of the imaging media includes but not limited to a screen edge, screen reflection, and/or a screen Moiré pattern of a display device. The clue information of the real counterfeited face includes but not limited to the characteristics of a masked face, the characteristics of a model face, and the characteristics of a sculpture face.

The counterfeited face clue information in the embodiments of the present disclosure can be observed by the human eyes under the visible light condition. The counterfeited face clue information can be dimensionally divided into 2D, 2.5D, and 3D counterfeited faces. The 2D counterfeited face refers to a facial image printed by a paper material, and the 2D counterfeited face clue information, for example, includes counterfeited clue information such as an edge of a paper face, the paper material, paper reflection, and the paper edge. 2.5D counterfeited face refers to a facial image borne by a carrier device such as a video copying device, and the 2.5D counterfeited face clue information, for example, includes counterfeited clue information such as a screen Moiré pattern, screen reflection, and a screen edge of the carrier device such as the video copying device. 3D counterfeited face refers to a real counterfeited face, such as a mask, a model, a sculpture, and 3D printing, and the 3D counterfeited face also has corresponding counterfeited clue information such as seams of the mask, and the abstract or too smooth skin of the model.

In an optional example, the operation 104 may be performed by a processor by invoking a corresponding instruction stored in a memory, or may be performed by an anti-counterfeiting detection module run by the processor.

106. Whether the face passes the face anti-counterfeiting detection is determined according to a detection result.

In operation 104 of the embodiments of the present disclosure, if the feature extracted from the video or image to be detected includes any piece of counterfeited face clue information, it is determined that the image to be detected is a counterfeited face image, and the image or video to be detected does not pass the face anti-counterfeiting detection. If the feature extracted from the video or image to be detected does not include any piece of counterfeited face clue information, it is determined that the video or image to be detected is not a counterfeited face image, but is a real facial image, and the image or video to be detected passes the face anti-counterfeiting detection.

In an optional example, the operation 106 may be performed by a processor by invoking a corresponding instruction stored in a memory, or may be performed by a determining module run by the processor.

Based on the face anti-counterfeiting detection method provided by the foregoing embodiments of the present disclosure, after an image or video to be detected containing a face is obtained, a feature of the image or video to be detected is extracted, and whether the extracted feature contains counterfeited face clue information is detected, and whether the image or video to be detected passes the face anti-counterfeiting detection is determined according to a detection result. The embodiments of the present disclosure can achieve effective face anti-counterfeiting detection, e.g., achieve effective face anti-counterfeiting detection under a visible light condition without relying on special multi-spectral devices. Moreover, since no special hardware device is required, the hardware cost is reduced, and it is convenient to be applied to various face detection scenarios, especially applicable to general mobile applications.

In an optional example of the face anti-counterfeiting detection method of the embodiments of the present disclosure, the operation 104 can be achieved by the following mode: inputting the image or video to be detected to a neural network; extracting, by the neural network, a feature of the image or video to be detected and detecting whether the extracted feature contains counterfeited face clue information; and outputting a detection result for indicating whether the image or video to be detected includes at least one piece of counterfeited face clue information, where the neural network has been pre-trained based on a training image set containing the counterfeited face clue information. The neural network of the embodiments of the present disclosure is a deep neural network, which refers to a multi-layer neural network, such as a multi-layer convolutional neural network.

The training image set includes a plurality of facial images serving as positive samples for training and a plurality of images serving as negative samples for training.

In an optional example, the training image set containing the counterfeited face clue information is obtained by the following operations:

obtaining a plurality of facial images serving as positive samples for training; and performing image processing for simulating the counterfeited face clue information on at least a part of the obtained at least one facial image to generate at least one image serving as a negative sample for training.

In an optional example of the face anti-counterfeiting detection method of the embodiments of the present disclosure, the operation 102 includes obtaining, by a visible light camera of a terminal device, an image or video to be detected containing a face. Accordingly, in the example, the neural network includes a first neural network located in the terminal device, that is, the operation 104 in the embodiments is performed by the first neural network located in the terminal device.

In another optional example of the face anti-counterfeiting detection method of the embodiments of the present disclosure, the operation 102 includes receiving, by a server, an image or video to be detected containing a face sent by the terminal device. In the example, the neural network includes a second neural network located in the server, that is, the operation 104 in the embodiments is performed by the second neural network located in the server. Accordingly, the example also includes: sending, by the server, a detection result about whether the extracted feature contains the counterfeited face clue information, or a determination result about whether the image or video to be detected passes the face anti-counterfeiting detection to the terminal device.

Figure 2:
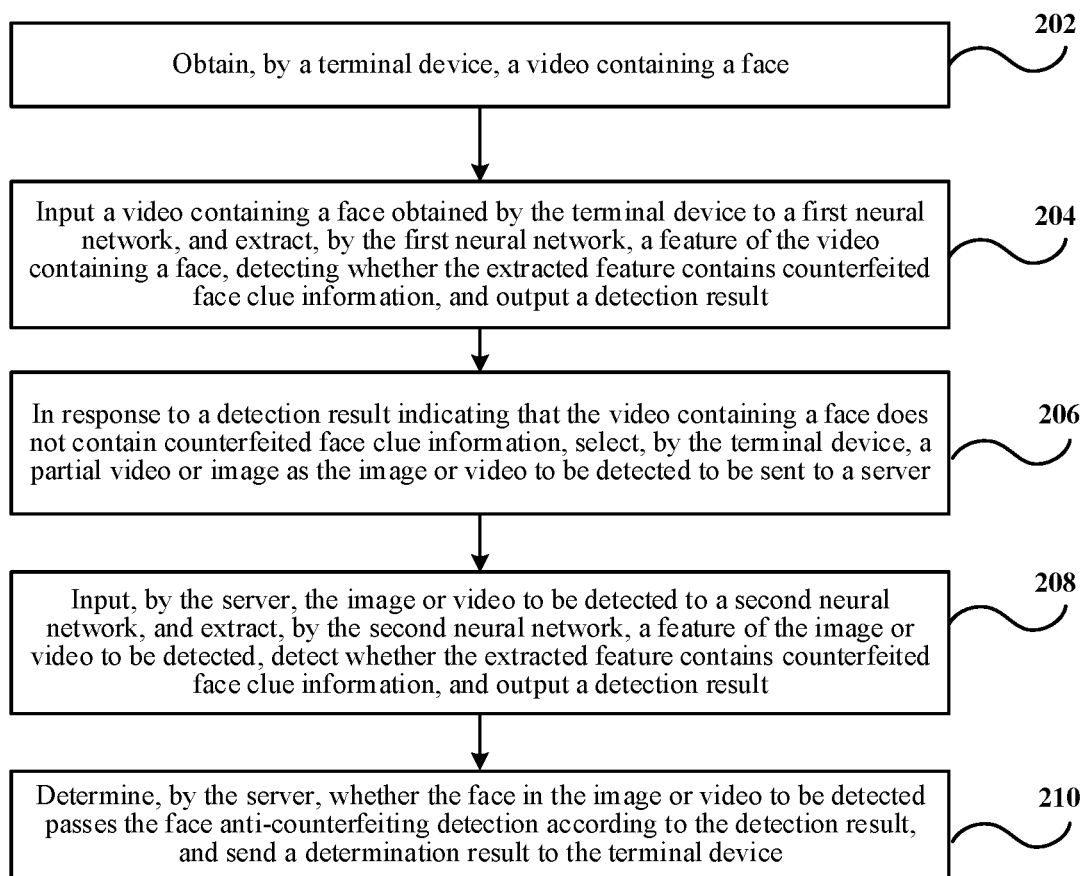
FIG. 2 illustrates a flowchart of another embodiment of a face anti-counterfeiting detection method according to the present disclosure.

FIG. 2 is a flowchart of another embodiment of a face anti-counterfeiting detection method according to the present disclosure. This embodiment is described by taking the neural network including a first neural network located in the terminal device and a second neural network located in the server as an example. The size of the first neural network is less than that of the second neural network, and According to one or more embodiments of the present disclosure, the number of network layers and/or parameters of the first neural network is less than that of the second neural network. In the embodiments of the present disclosure, the first neural network and the second neural network are separately a multi-layer neural network (i.e., a deep neural network), such as a multi-layer convolutional neural network, for example, any neural network model such as LeNet, AlexNet, GoogLeNet, VGG and ResNet. The first neural network and the second neural network can adopt the neural network of the same type and structure, and can also adopt the neural networks of different types and structures. As shown in FIG. 2, the face anti-counterfeiting detection method of this embodiment includes:

202. A video containing a face is obtained by a terminal device.

Exemplarily, the terminal device can obtain the video containing a face by means of a visible light camera.

In an optional example, the operation 202 may be performed by the visible light camera on the terminal device.

204. The video containing a face obtained by the terminal device is input to a first neural network in the terminal device, and the first neural network extracts a feature of the video containing a face, detects whether the extracted feature contains counterfeited face clue information, and outputs a detection result for indicating whether the video containing a face contains at least one piece of counterfeited face clue information.

The counterfeited face clue information has human eye observability under a visible light condition. The first neural network has been pre-trained based on a training image set containing the counterfeited face clue information.

Exemplarily, the counterfeited face hack included in the features extracted by the embodiments of the present disclosure can be learned by the first neural network by pre-training the first neural network, and any image containing the counterfeited face clue information will be detected after being input in the first neural network, and is determined as a counterfeited face image, otherwise a real face image.

In an optional example, the operation 204 may be performed by a processor by invoking a corresponding instruction stored in a memory, or may be performed by a first neural network in the terminal device run by the processor.

206. In response to a detection result indicates that the video containing a face does not contain counterfeited face clue information, a partial video or image is selected by the terminal device from the video containing a face as the image or video to be detected to be sent to a server.

The partial video may be a video stream including one or more images to be detected, or only one or more images to be detected; may be selected according to preset settings, or may be adjusted in real time according to actual conditions.

According to one or more embodiments of the present disclosure, if the first neural network outputs a detection result that the video containing a face contains the counterfeited face clue information, it can be determined that the image or video to be detected fails to pass the face anti-counterfeiting detection, and a determination result that the face in the image or video to be detected fails to pass the face anti-counterfeiting detection can be determined by the terminal device according to the detection result output by the first neural network, and the following process of this embodiment is not performed.

In an optional example, the operation 206 may be performed by a processor by invoking a corresponding instruction stored in a memory, or may be performed by a first sending module in the terminal device run by the processor.

208. After receiving the image or video to be detected containing a face sent by the terminal device, the server inputs the image or video to be detected containing a face to a second neural network, and the second neural network extracts a feature of the image or video to be detected, detects whether the extracted feature contains counterfeited face clue information, and outputs a detection result for indicating whether the image or video to be detected contains at least one piece of counterfeited face clue information.

The counterfeited face clue information has human eye observability under a visible light condition. The second neural network has been pre-trained based on a training image set containing the counterfeited face clue information.

Exemplarily, the counterfeited face hack included in the features extracted by the embodiments of the present disclosure can be learned by the second neural network by pre-training the second neural network, and any image containing the counterfeited face clue information will be detected after being input in the second neural network, and is determined as a counterfeited face image, otherwise a real facial image.

Exemplarily, if in operation 206, the terminal device sends a video to the server, then in operation 208, the server can select at least one image from the received video as the image to be detected to be input to the second neural network, and the second neural network extracts a feature of the image to be detected, detects whether the extracted feature contains counterfeited face clue information, and outputs a detection result for indicating whether the image to be detected contains at least one piece of counterfeited face clue information.

In addition, if in operation 206, the terminal device sends an image to the server, then in operation 208, the server can input the received images to the second neural network, or select at least one image from the received image to be input to the second neural network, and the second neural network extracts a feature of the received image, detects whether the extracted feature contains counterfeited face clue information, and outputs a detection result for indicating whether the image contains at least one piece of counterfeited face clue information.

In an optional example, the operation 208 may be performed by a processor by invoking a corresponding instruction stored in a memory, or may be performed by a first obtaining module in the server and a second neural network run by the processor.

210. The server determines whether the face in the image or video to be detected passes the face anti-counterfeiting detection according to the detection result, and sends a determination result about whether the face in the image or video to be detected passes the face anti-counterfeiting detection to the terminal device.

In an optional example, the operation 210 may be performed by a processor by invoking a corresponding instruction stored in a memory, or may be performed by a determining module in the server.

In addition, in another optional embodiment, in operation 210, alternatively, the server sends to the terminal device the detection result for indicating whether the image or video to be detected contains at least one piece of counterfeited face clue information output by the second neural network, and the terminal device determines whether the face in the image or video to be detected passes the face anti-counterfeiting detection according to the detection result output by the first neural network and the detection result output by the second neural network, rather than the server determines whether the face in the image or video to be detected passes the face anti-counterfeiting detection, and sends a determination result to the terminal device.

According to one or more embodiments of the present disclosure, if the detection result output by the first neural network is that the image or video to be detected contains at least one piece of counterfeited face clue information, it is determined that the face in the image or video to be detected fails to pass the face anti-counterfeiting detection; if the detection result output by the first neural network is that the image or video to be detected does not contain any counterfeited face clue information, but the detection result output by the second neural network is that the image or video to be detected contains at least one piece of counterfeited face clue information, it is determined that the face in the image or video to be detected fails to pass the face anti-counterfeiting detection; and if the detection result output by the first neural network is that the image or video to be detected does not contain any counterfeited face clue information, and the detection result output by the second neural network is that the image or video to be detected does not contain any counterfeited face clue information, it is determined that the face in the image or video to be detected passes the face anti-counterfeiting detection.

Since the hardware performance of the terminal device is generally limited, the neural network for more feature extraction and detection requires more computing and storage resources, and the computing and storage resources of the terminal device are limited relative to a cloud server, in order to save the computing and storage resources occupied by the neural network of the terminal device and ensure effective face anti-counterfeiting detection, in the embodiments of the present disclosure, a small first neural network (lower network and/or less network parameters) is set in the terminal device, and fewer features are fused, for example, only the LBP feature and the face SMALL feature are extracted from the image or video to be detected, to detect the corresponding counterfeited face clue information, and a large second neural network (deeper network and/or more network parameters) is set in the cloud server with better hardware performance, and the comprehensive anti-counterfeiting hack features are fused, so that the second neural network is more robust and has better detection performance. In addition to extraction of the LBP feature and the face SMALL feature from the image or video to be detected, the HSC feature, the LARGE feature, the TINY feature, and other features possibly containing the counterfeited face clue information can also be extracted. If the face in the video collected by the first neural network passes the face anti-counterfeiting detection, the second neural network is used to perform more accurate and comprehensive face anti-counterfeiting detection, thereby improving the accuracy of the detection result. If the face in the video collected by the first neural network fails to pass the face anti-counterfeiting detection, there is no need to perform the face anti-counterfeiting detection by means of the second neural network, which improves the efficiency of the face anti-counterfeiting detection.

Further, in an optional example of the embodiments of the present disclosure, in operation 206, the selecting, by the terminal device, a partial video or image from the video containing a face as the image or video to be detected to be sent to the server includes:

obtaining a status of a network currently used by the terminal device. The operation is performed before the terminal device performs operation 202, or is performed by any moment before operation 206.

When the status of the network (such as the network type and the network bandwidth) currently used by the terminal device satisfies a first preset condition, for example, when the network currently used by the terminal device is a wireless local area network (e.g., WiFi), and the bandwidth is greater than a first preset bandwidth, the terminal device selects a partial video from the obtained video containing a face as the video to be detected to be sent to the server. When the status of the network currently used by the terminal device is good, the video to be detected is sent to the server, or a partial video is selected from the video to be detected to be sent to the server. Since the video includes many images, if the network conditions permit, the video is sent to the server for face anti-counterfeiting detection to achieve more comprehensive face anti-counterfeiting detection.

When the status of the network currently used by the terminal device does not satisfy the first preset condition, but satisfies the second preset condition, for example, when the network currently used by the terminal device is a mobile data network, and the bandwidth is greater than a second preset width, or when the network currently used by the terminal device is a wireless local area network (e.g., WiFi), and the bandwidth is less than the first preset bandwidth, the terminal device selects one or more images that satisfy a preset standard from the obtained video containing a face as the image to be detected to be sent to the server, so as to achieve face anti-counterfeiting detection in a poor network status.

In addition, in a further optional example, the method further includes:

When the status of the network currently used by the terminal device does not satisfy the second preset condition, for example, when the terminal device does not currently access any network, or when the bandwidth of the network currently used by the terminal device is less than the second preset bandwidth, the terminal device can output a prompt message about detection failure, or the first neural network in the terminal device is utilized to extract the feature of the video containing a face, detect whether the extracted feature contains counterfeited face clue information, and output a detection result for indicating whether the video containing a face contains at least one piece of counterfeited face clue information, and the terminal device determines whether the face passes the face anti-counterfeiting detection according to the detection result.

In an optional example of the foregoing embodiments, when selecting a partial video from the video obtained by the terminal device as the video to be detected to be sent to the second neural network, extracting, by the second neural network, a feature of the video to be detected, and detecting whether the extracted feature contains counterfeited face clue information include:

selecting, by the server, at least one image from the video to be detected as the image to be detected to be input to the second neural network, and outputting, by the second neural network, a detection result for indicating whether the image to be detected contains at least one piece of counterfeited face clue information.

In an optional example of the foregoing embodiments, when the terminal device selects a partial video or image from the video containing a face as the image or video to be detected to be sent to the server, or when the server selects an image to be detected from the image or video to be detected sent by the terminal device to detect the counterfeited face clue information, a high-quality image is selected to detect the counterfeited face clue information according to a preset selection standard. The selection standard may be, for example, any one or more of the following: whether the face orientation is positive, the image resolution, the exposure level, etc., and the image with higher comprehensive quality is selected according to the corresponding standard for face anti-counterfeiting detection, so as to improve the feasibility of face anti-counterfeiting detection and the accuracy of the detection results.

The embodiments of the present disclosure focus on detecting whether the image or video to be detected has a counterfeited hack (i.e., the counterfeited face clue information), and verifying the activity in a nearly non-interactive manner, which is called silent living body detection. There is basically no interaction in the process of silent living body detection, which greatly simplifies the living body detection process. The detected person only needs to face a video or image acquisition device (for example, the visible light camera) of a device where the neural network is located, it is only needed to adjust the light and position, and no action interaction is required in the living body detection process. The neural network in the embodiments of the present disclosure learns in advance the counterfeited face clue information that can be "observed" by the human eye in multiple dimensions through the learning and training method, thereby determining whether the facial image is derived from a real living body in the subsequent application. If the video or image to be detected contains any counterfeited face clue information, these hacks will be captured by the neural network, and the user is prompted that the facial image in the counterfeited face clue information is a counterfeited face image. For example, the face in a counterfeited face image of video copying is determined to be a non-living body by determining the features of the screen reflection or the screen edge in the facial image.

According to one or more embodiments of the present disclosure, any of the foregoing embodiments of the present disclosure can also perform living body detection on the video obtained by the terminal device by using the neural network (302). Exemplarily, the operation 302 can include: performing, by the neural network, validity detection of a required action on the video obtained by the terminal device; and at least in response to a validity detection result of the required action satisfying a preset condition, determining that the video obtained by the terminal device passes the living body detection.

The required action is a preset required action or a randomly selected required action, that is, the user may be required to make a preset required action within a preset time period, or the user may be required to make a required action randomly selected from the required action set within a preset time period. For example, the required action includes one or more of the following: blink, open mouth, shut up, smile, nod up, nod down, turn left, turn right, tilt left, tilt right, head down, and head up.

Figure 3:
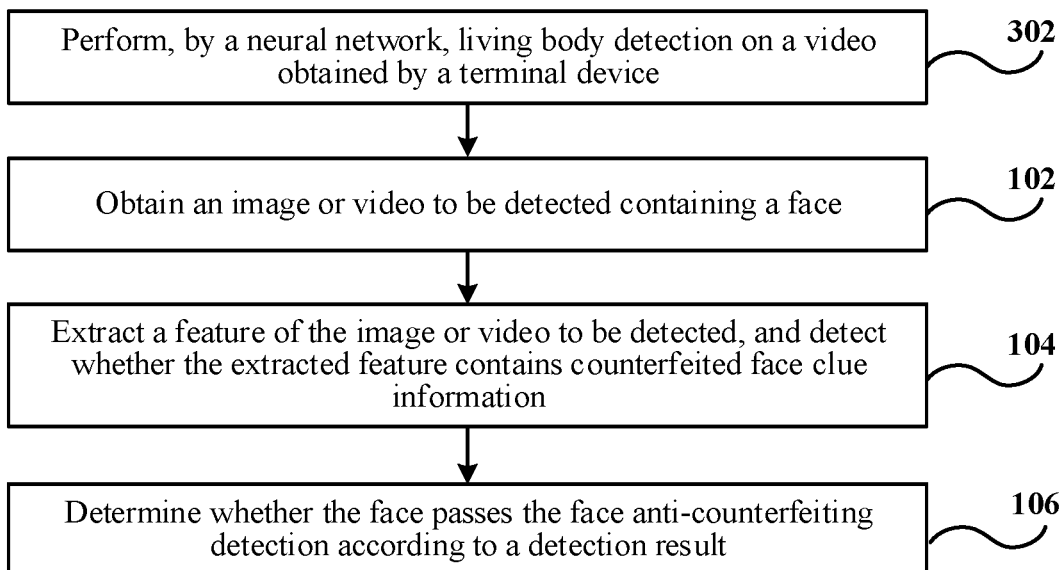
FIG. 3 illustrates a flowchart of still another embodiment of a face anti-counterfeiting detection method according to the present disclosure.

After the living body detection is passed, the process of the embodiments of the face anti-counterfeiting detection method is performed, for example, the process of the operation 102 in the embodiment shown in FIG. 1 or the operation 202 in the embodiment shown in FIG. 2 is started to perform the face anti-counterfeiting detection. FIG. 3 is a flowchart of still another embodiment of a face anti-counterfeiting detection method according to the present disclosure.

The embodiment of the present disclosure also achieves face anti-counterfeiting detection while performing the living body detection, which can resist the counterfeiting attack, and solves the problem that lawbreakers can easily use the photo or video of the user to be verified to counterfeit the user action when performing the living body detection, thereby improving the security of the face authentication technology. Moreover, the hardware cost caused by the special hardware device is reduced, and the embodiment can be conveniently applied to various face detection scenarios, and has a wide application range, especially suitable for general mobile applications.

Figure 4:
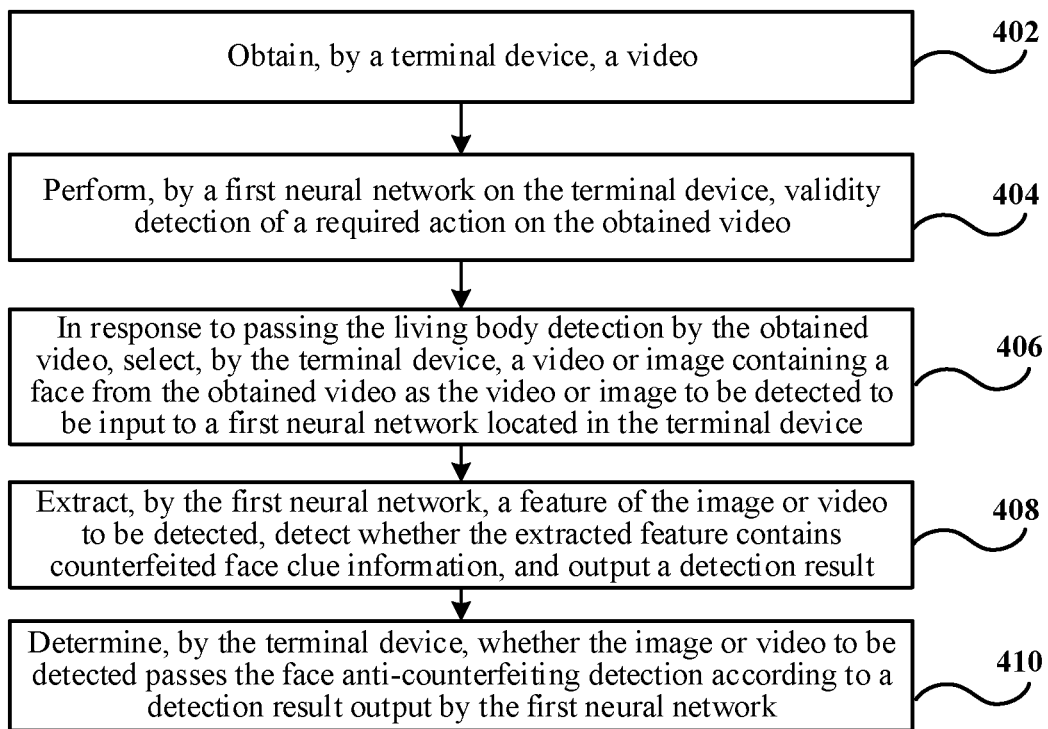
FIG. 4 illustrates a flowchart of yet another embodiment of a face anti-counterfeiting detection method according to the present disclosure.

FIG. 4 is a flowchart of yet another embodiment of a face anti-counterfeiting detection method according to the present disclosure. As shown in FIG. 4, the face anti-counterfeiting detection method of this embodiment includes:

402. A video is obtained by a terminal device.

In an optional example, the operation 402 may be performed by the terminal device.

404. Validity detection of a required action is performed on the obtained video by using the first neural network on the terminal device.

Exemplarily, the first neural network can determine whether the living body detection is passed by detecting whether the user in the video makes an effective required action within a preset time period.

At least in response to a validity detection result indicates the required action satisfies a preset condition, the living body detection is passed, and operation 406 is performed. Otherwise, in response to a validity detection result indicates the required action dissatisfies a preset condition, the living body detection fails, and the subsequent process of this embodiment is not performed.

In an optional example, the operation 404 may be performed by a processor by invoking a corresponding instruction stored in a memory, or may be performed by a first neural network in the terminal device run by the processor.

406. The terminal device selects a video or image containing a face from the obtained video as the video or image to be detected to be input to a first neural network located in the terminal device.

In an optional example, the operation 406 may be performed by the terminal device or a first sending module therein.

408. The first neural network extracts a feature of the image or video to be detected, detects whether the extracted feature contains counterfeited face clue information, and outputs a detection result for indicating whether the image or video to be detected contains at least one piece of counterfeited face clue information.

In an optional example, the operation 404 may be performed by a processor by invoking a corresponding instruction stored in a memory, or may be performed by a first neural network run by the processor.

410. Whether the image or video to be detected passes the face anti-counterfeiting detection is determined by the terminal device according to a detection result output by the first neural network.

In operation 408 of this embodiment, if the feature extracted from the video or image to be detected includes any piece of counterfeited face clue information, the operation 410 determines that the image to be detected is a counterfeited face image, and the image or video to be detected does not pass the face anti-counterfeiting detection. In operation 408 of this embodiment, if the feature extracted from the video or image to be detected does not include any piece of counterfeited face clue information, the operation 410 determines that the video or image to be detected is not a counterfeited face image, but is a real facial image, and the image or video to be detected passes the face anti-counterfeiting detection.

In an optional example, the operation 410 may be performed by a processor by invoking a corresponding instruction stored in a memory, or may be performed by a determining module in the terminal device run by the processor.

Figure 5:
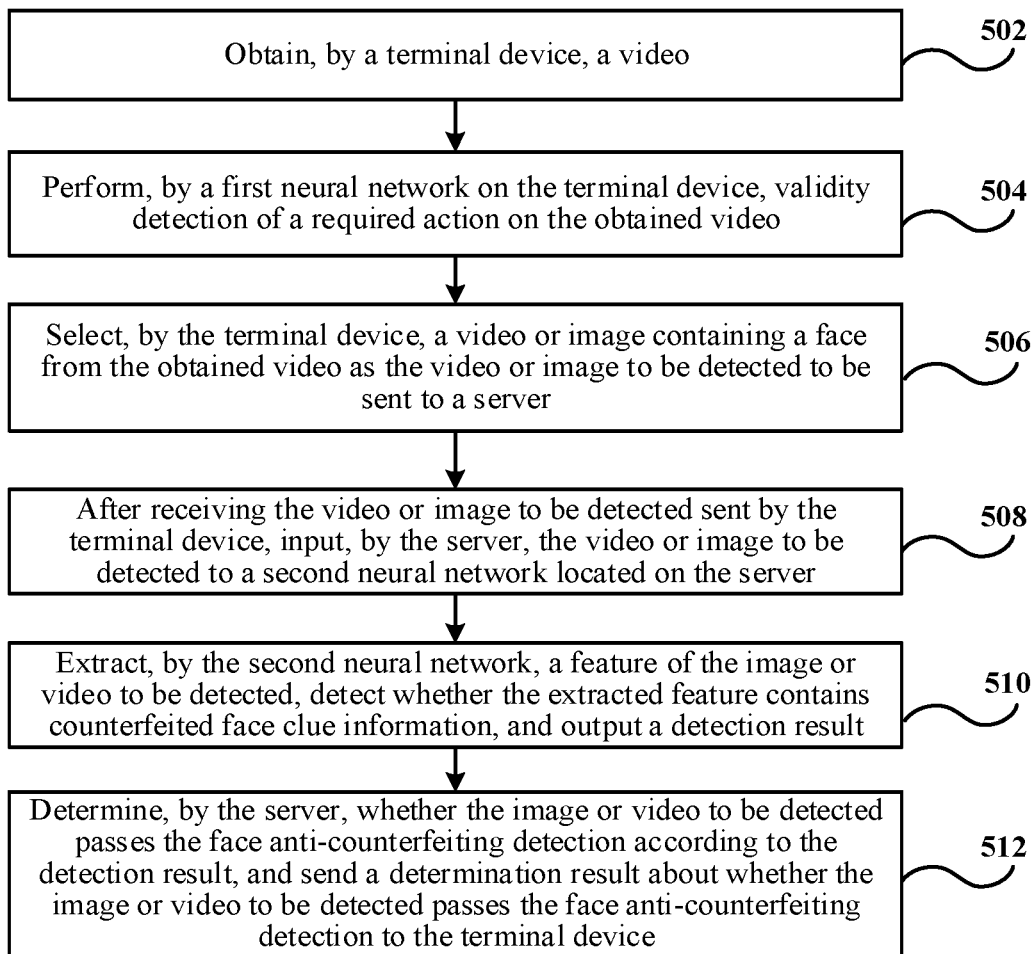
FIG. 5 illustrates a flowchart of yet another embodiment of a face anti-counterfeiting detection method according to the present disclosure.

FIG. 5 is a flowchart of yet another embodiment of a face anti-counterfeiting detection method according to the embodiments of the present disclosure. As shown in FIG. 5, the face anti-counterfeiting detection method of this embodiment includes:

502. A video is obtained by a terminal device.

In an optional example, the operation 502 may be performed by the terminal device.

504. Validity detection of a required action is performed on the obtained video by using a first neural network on the terminal device.

At least in response to a validity detection result indicates the required action satisfies a preset condition, the living body detection is passed, and operation 506 is performed. Otherwise, in response to a validity detection result indicates the required action dissatisfies a preset condition, the living body detection fails, and the subsequent process of this embodiment is not performed.

In an optional example, the operation 504 may be performed by a processor by invoking a corresponding instruction stored in a memory, or may be performed by a first neural network in the terminal device run by the processor.

506. The terminal device selects a video or image containing a face from the obtained video as the video or image to be detected to be sent to the server.

In an optional example, the operation 506 may be performed by a processor by invoking a corresponding instruction stored in a memory, or may be performed by a terminal device or a first sending module in the terminal device run by the processor.

508. After receiving the video or image to be detected sent by the terminal device, the server inputs the video or image to be detected to a second neural network located on the server.

In an optional example, the operation 508 may be performed by a processor by invoking a corresponding instruction stored in a memory, or may be performed by a first obtaining module in the server and a second neural network run by the processor.

510. The second neural network extracts a feature of the image or video to be detected, detects whether the extracted feature contains counterfeited face clue information, and outputs a detection result for indicating whether the image or video to be detected contains at least one piece of counterfeited face clue information.

In an optional example, the operation 510 may be performed by a processor by invoking a corresponding instruction stored in a memory, or may be performed by a second neural network in the server run by the processor.

512. The server determines whether the image or video to be detected passes the face anti-counterfeiting detection according to the detection result, and sends a determination result about whether the image or video to be detected passes the face anti-counterfeiting detection to the terminal device.

In operation 510 of this embodiment, if the feature extracted from the video or image to be detected includes any piece of counterfeited face clue information, the operation 512 determines that the image to be detected is a counterfeited face image, and the image or video to be detected does not pass the face anti-counterfeiting detection. In operation 510 of this embodiment, if the feature extracted from the video or image to be detected does not include any piece of counterfeited face clue information, the operation 512 determines that the video or image to be detected is not a counterfeited face image, but is a real facial image, and the image or video to be detected passes the face anti-counterfeiting detection.

In an optional example, the operation 512 may be performed by a processor by invoking a corresponding instruction stored in a memory, or may be performed by a determining module and a second sending module in the server run by the processor.

In addition, in yet another embodiment of the face anti-counterfeiting detection method according to the embodiments of the present disclosure, living body detection is performed on the video obtained by the terminal device through operations 402-404 or operations 502-504 by using the first neural network, and a video containing a face is obtained from the video obtained by the terminal device after it is determined that the video obtained by the terminal device passes the living body detection, and then operations 204-210 are performed.

Based on the embodiments of the face anti-counterfeiting detection method, living body detection is performed on the video first, to detect whether the face in the video is active. In the case that face anti-counterfeiting detection is performed after the video passes the living body detection to resist counterfeiting attack, the problem that the illegal elements are easy to be used for the live detection of the video. The problem that lawbreakers can easily use the photo or video of the user to be verified to counterfeit the user action when performing the living body detection is solved.

Any face anti-counterfeiting detection method provided in the embodiments of the present disclosure may be executed by any appropriate device having data processing capability, including, but not limited to, a terminal device and a server, etc. Alternatively, any face anti-counterfeiting detection method provided in the embodiments of the present disclosure may be executed by a processor, for example, any face anti-counterfeiting detection method mentioned in the embodiments of the present disclosure is executed by the processor by invoking corresponding instructions stored in a memory. Details are not described below again.

Persons of ordinary skill in the art may understand that all or some operations for implementing the foregoing method embodiments are achieved by a program by instructing related hardware; the foregoing program can be stored in a computer-readable storage medium; when the program is executed, operations including the foregoing method embodiments are executed. Moreover, the foregoing storage medium includes various media capable of storing program codes such as ROM, RAM, a magnetic disk, or an optical disk.

Figure 6:
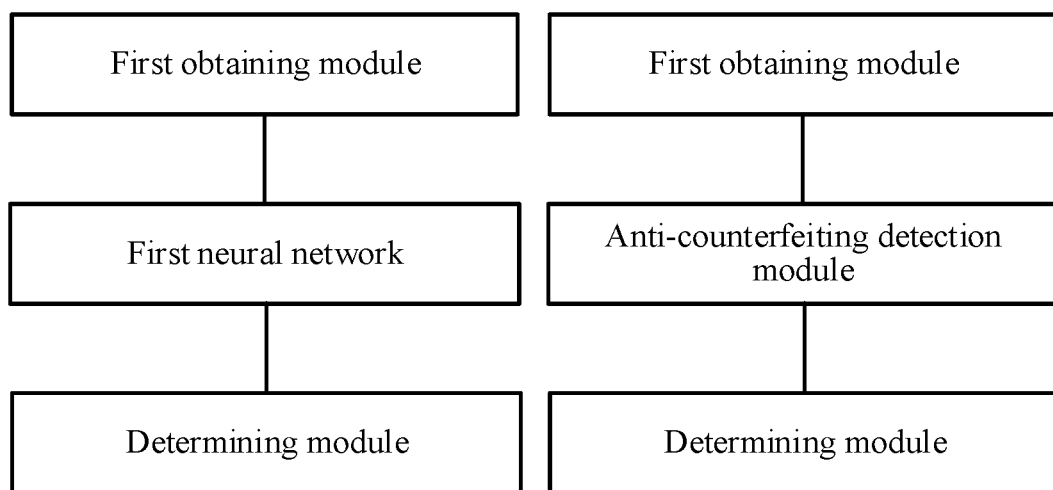
FIG. 6 illustrates a schematic structural diagram of an embodiment of a face anti-counterfeiting detection system according to the present disclosure.

FIG. 6 is a schematic structural diagram of an embodiment of a face anti-counterfeiting detection system according to the present disclosure. The face anti-counterfeiting detection system of this embodiment can be configured to implement the foregoing embodiments of the face anti-counterfeiting detection methods of the present disclosure. As shown in FIG. 6, the face anti-counterfeiting detection system of this embodiment includes a first obtaining module, an anti-counterfeiting detection module, and a determining module.

A first obtaining module is configured to obtain an image or video to be detected containing a face. In an optional example, the first obtaining module is a visible light camera of the terminal device.

The anti-counterfeiting detection module is configured to extract a feature of the image or video to be detected, and detect whether the extracted feature contains counterfeited face clue information, where the counterfeited face clue information has human eye observability under a visible light condition. In an optional example of the embodiments of the present disclosure, the extracted features in the embodiments of the present disclosure, for example, include but not limited any one of the following: LBP feature, HSC feature, LARGE feature, SMALL feature, and TINY feature. In an optional application, feature items included in the extracted feature are updated according to possible counterfeited face clue information. In an optional example of the embodiments of the present disclosure, the counterfeited face clue information in the embodiments of the present disclosure has human eye observability under a visible light condition. The counterfeited face clue information includes but not limited to one or more of the following: counterfeited clue information of an imaging medium, counterfeited clue information of an imaging media, and clue information of a real counterfeited face. The counterfeited clue information of the imaging medium includes but not limited to edge information, reflection information, and/or material information of the imaging medium. The counterfeited clue information of the imaging media includes but not limited to a screen edge, screen reflection, and/or a screen Moiré pattern of a display device. The clue information of the real counterfeited face includes but not limited to the characteristics of a masked face, the characteristics of a model face, and the characteristics of a sculpture face.

The determining module is configured to determine whether the face passes the face anti-counterfeiting detection according to a detection result.

Based on the face anti-counterfeiting detection system provided by the foregoing embodiments of the present disclosure, after an image or video to be detected containing a face is obtained, a feature of the image or video to be detected is extracted, and whether the extracted feature contains counterfeited face clue information is detected, and whether the image or video to be detected passes the face anti-counterfeiting detection is determined according to a detection result. The embodiments of the present disclosure can achieve effective face anti-counterfeiting detection, e.g., achieve effective face anti-counterfeiting detection under a visible light condition without relying on special multi-spectral devices. Moreover, since no special hardware device is required, the hardware cost is reduced, and it is convenient to be applied to various face detection scenarios, especially applicable to general mobile applications.

In an optional example of the embodiments of the face anti-counterfeiting detection systems of the present disclosure, the anti-counterfeiting detection module is achieved by a neural network, and the neural network is configured to receive the input image or video to be detected, and output a detection result for indicating whether the image or video to be detected contains at least one piece of anti-counterfeiting face clue information, where the neural network has been pre-trained based on a training image set containing the counterfeited face clue information.

Exemplarily, the training image set includes a plurality of facial images serving as positive samples for training and a plurality of images serving as negative samples for training. Accordingly, the face anti-counterfeiting detection system of this embodiment further includes: a second obtaining module configured to obtain a plurality of facial images serving as positive samples for training, and perform image processing for simulating the counterfeited face clue information on at least a part of the obtained at least one facial image to generate at least one image serving as a negative sample for training.

Figure 7:
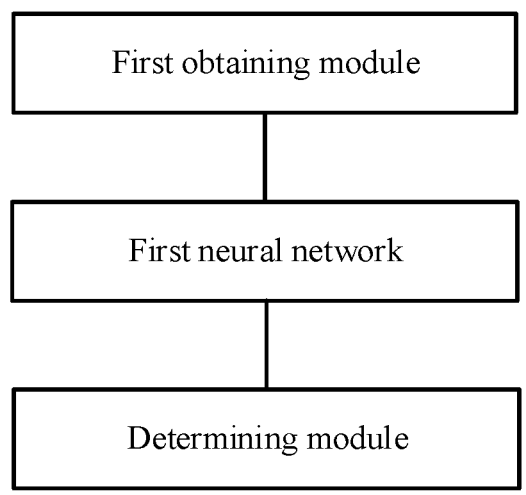
FIG. 7 illustrates a schematic structural diagram of another embodiment of a face anti-counterfeiting detection system according to the present disclosure.

In an optional example of the embodiments of the face anti-counterfeiting detection systems of the present disclosure, the neural network includes a first neural network located in the terminal device. Accordingly, in this embodiment, the first obtaining module and the determining module are located in the terminal device. The determining module is configured to determine whether the face passes the face anti-counterfeiting detection according to a detection result output by the first neural network. FIG. 7 is a schematic structural diagram of a face anti-counterfeiting detection system of this embodiment of the present disclosure.

In another optional example of the face anti-counterfeiting detection system of the embodiments of the present disclosure, a first obtaining module is located on a server and configured to receive an image or video to be detected containing a face sent by the terminal device. Accordingly, in this embodiment, the neural network includes a second neural network located in the server.

Figure 8:
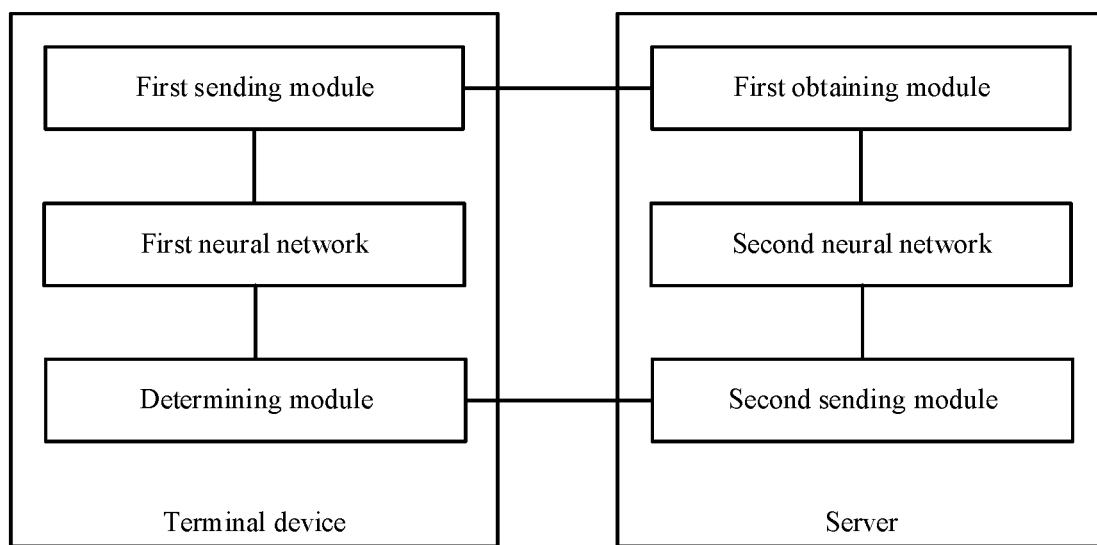
FIG. 8 illustrates a schematic structural diagram of still another embodiment of a face anti-counterfeiting detection system according to the present disclosure.

In addition, in still another optional example based on the another optional example, the neural network further includes a first neural network located in the terminal device and configured to receive the input image or video to be detected, and output a detection result for indicating whether the video containing a face contains at least one piece of anti-counterfeiting face clue information, where the size of the first neural network is less than that of the second neural network. FIG. 8 is a possible schematic structural diagram of one of the face anti-counterfeiting detection systems of this embodiment of the present disclosure.

According to one or more embodiments of the present disclosure, in the still another optional example, the face anti-counterfeiting detection system further includes a first sending module located on the terminal device and configured to: in response to a detection result indicates that the video containing a face does not contain counterfeited face clue information, select, according to the detection result output by the first neural network, a partial video or image from the video containing a face as the image or video to be detected to be sent to the server.

Exemplarily, the first sending module is configured to obtain a status of a network currently used by the terminal device; if the status of the network currently used by the terminal device satisfies a first preset condition, select a partial video from the video obtained by the terminal device as the video to be detected to be sent to the server; and/or if the status of the network currently used by the terminal device does not satisfy the first preset condition, but the status of the network currently used by the terminal device satisfies a second preset condition, select at least one image that satisfies a preset standard from the video obtained by the terminal device as the image to be detected to be sent to the server.

Exemplarily, when the first sending module selects a partial video from the video obtained by the terminal device as the video to be detected to be sent to the server, the system further includes: a selecting module configured to select at least one image from the video to be detected as the image to be detected to be input to the second neural network.

In an optional example of the system embodiments shown in FIG. 8, the determining module is located on the terminal device and further configured to: in response to a detection result indicates that the video containing a face contains counterfeited face clue information, determine that the face fails to pass the face anti-counterfeiting detection according to the detection result output by the first neural network.

In another optional example of the system embodiments shown in FIG. 8, the system further includes a second sending module located on the server and configured to return to the terminal device the detection result output by the second neural network. Accordingly, in this embodiment, the determining module is located on the terminal device and configured to determine whether the face passes the face anti-counterfeiting detection according to a detection result output by the second neural network.

In still another optional example of the system embodiments shown in FIG. 8, the determining module is located on the server and configured to determine whether the face passes the face anti-counterfeiting detection according to the detection result output by the second neural network. Accordingly, the face anti-counterfeiting detection system of this embodiment further includes a second sending module located on the server and configured to send to the terminal device a determination result about whether the face passes the face anti-counterfeiting detection.

Further, in the face anti-counterfeiting detection system of the embodiments of the present disclosure, the neural network is further configured to perform living body detection on the video obtained by the terminal device.

In one of optional examples, when performing living body detection on the video obtained by the terminal device, the neural network is configured to perform validity detection of a required action on the video obtained by the terminal device. The living body detection is passed at least in response to a validity detection result indicates the required action satisfies a preset condition.

In one of optional examples, the neural network is configured to use a first neural network to perform living body detection on the video obtained by the terminal device, and in response to the video obtained by the terminal device passes the living body detection, use the first neural network to execute the operations of extracting a feature of the video obtained by the terminal device and detecting whether the extracted feature contains counterfeited face clue information; or the neural network is configured to use a first neural network to perform living body detection on the video obtained by the terminal device, and in response to the video obtained by the terminal device passes the living body detection, receive the image or video to be detected sent by the first sending module located on the terminal device, and output a detection result for indicating whether the image or video to be detected contains at least one piece of counterfeited face clue information.

The required action is a preset required action or a randomly selected required action, that is, the user may be required to make a preset required action within a preset time period, or the user may be required to make a required action randomly selected from the required action set within a preset time period. For example, the required action includes one or more of the following: blink, open mouth, shut up, smile, nod up, nod down, turn left, turn right, tilt left, tilt right, head down, and head up.

In addition, the embodiments of the present disclosure further provide an electronic device, including the face anti-counterfeiting detection system according to any of the embodiments of the present disclosure. According to one or more embodiments of the present disclosure, the electronic device is, for example, a device such as a terminal device or a server.

In addition, another electronic device provided in the embodiments of the present disclosure includes:

a memory configured to store executable instructions; and a processor configured to communicate with the memory to execute the executable instructions so as to complete the operations of the face anti-counterfeiting detection method according to any one of the embodiments of the present disclosure.

Figure 9:
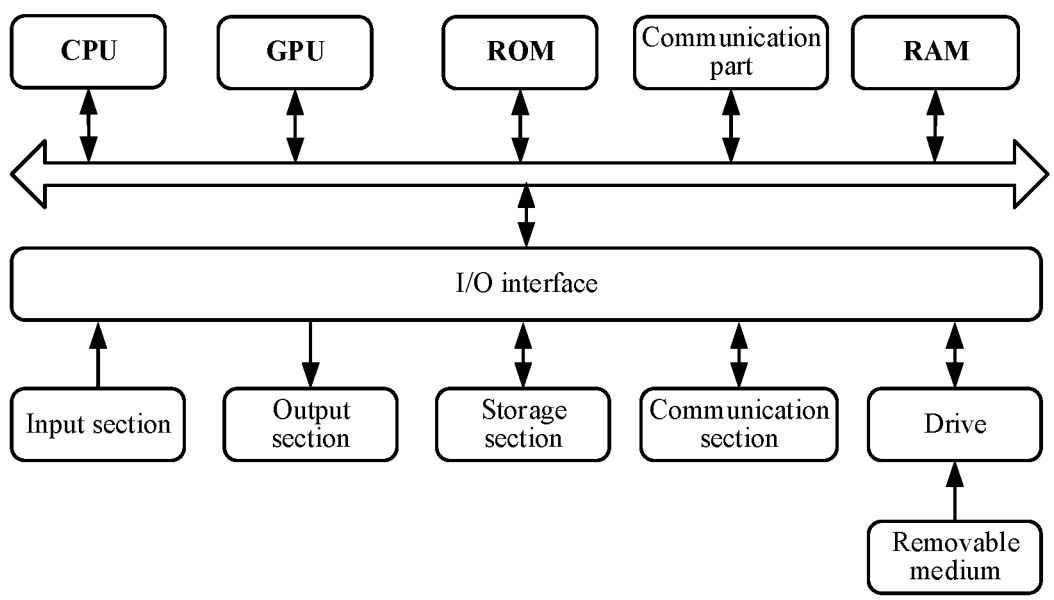
FIG. 9 illustrates a schematic structural diagram of an application embodiment of an electronic device of the present disclosure.

FIG. 9 is a schematic structural diagram of an application embodiment of an electronic device of the present disclosure. Referring to FIG. 9 below, a schematic structural diagram of an electronic device suitable for implementing a terminal device or a server according to the embodiments of the present disclosure is shown. As shown in FIG. 9, the electronic device includes one or more processors, a communication part, and the like. The one or more processors are, for example, one or more Central Processing Units (CPUs), and/or one or more Graphic Processing Units (GPUs), and the like. The processor may perform various appropriate actions and processing according to executable instructions stored in a Read-Only Memory (ROM) or executable instructions loaded from a storage section to a Random-Access Memory (RAM). The communication part may include, but is not limited to, a network card. The network card may include, but is not limited to, an IB network card. The processor may communicate with the ROM and/or the RAM to execute executable instructions. The processor is connected to the communication part via a bus, and communicates with other target devices via the communication part, thereby completing corresponding operations of any method provided in the embodiments of the present disclosure, e.g., obtaining an image or video to be detected containing a face; extracting a feature of the image or video to be detected, and detecting whether the extracted feature contains counterfeited face clue information; and determining whether the face passes the face anti-counterfeiting detection according to a detection result.

In addition, the RAM may further store various programs and data required for operations of an apparatus. The CPU, the ROM, and the RAM are connected to each other via the bus. In the presence of the RAM, the ROM is an optional module. The RAM stores executable instructions, or writes the executable instructions into the ROM during running, where the executable instructions cause the processor to execute corresponding operations of any method of the present disclosure. An input/output (I/O) interface is also connected to the bus. The communication part may be integrated, or may be configured to have a plurality of sub-modules (for example, a plurality of IB network cards) connected to the bus.

The following components are connected to the I/O interface: an input section including a keyboard, a mouse and the like; an output section including a Cathode-Ray Tube (CRT), a Liquid Crystal Display (LCD), a speaker and the like; the storage section including a hard disk and the like; and a communication section of a network interface card including an LAN card, a modem and the like. The communication section performs communication processing via a network such as the Internet. A drive is also connected to the I/O interface according to requirements. A removable medium such as a magnetic disk, an optical disk, a magneto-optical disk, a semiconductor memory or the like is mounted on the drive according to requirements, so that a computer program read from the removable medium may be installed on the storage section according to requirements.

It should be noted that the architecture illustrated in FIG. 9 is merely an optional implementation mode. During specific practice, the number and types of the components in FIG. 9 may be selected, decreased, increased, or replaced according to actual requirements. Different functional components may be separated or integrated or the like. For example, the GPU and the CPU may be separated, or the GPU may be integrated on the CPU, and the communication part may be separated from or integrated on the CPU or the GPU or the like. These alternative implementations all fall within the scope of protection of the present disclosure.

Particularly, a process described above with reference to a flowchart according to the embodiments of the present disclosure is implemented as a computer software program. For example, the embodiments of this disclosure include a computer program product. The computer program product includes a computer program tangibly included in a machine-readable medium. The computer program includes a program code for performing a method shown in the flowchart. The program code may include instructions for performing operations of the face anti-counterfeiting detection method provided in the embodiments of the present disclosure. In such an embodiment, the computer program is downloaded and installed from the network through the communication section, and/or is installed from the removable medium. When the computer program is executed by the CPU, the functions defined in the method according to the present disclosure are executed.

In addition, the embodiments of the present disclosure further provide a computer program, including a computer-readable code, where when the computer-readable code runs in a device, a processor in the device executes instructions for implementing the operations of the method according to any one of the embodiments of the present disclosure.

In addition, the embodiments of the present disclosure further provide a computer-readable storage medium configured to store computer-readable instructions, where when the instructions are executed, the operations in the operations of the method according to any one of the embodiments of the present disclosure are executed.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and devices in the present disclosure may be implemented in many manners. For example, the methods and devices in the present disclosure may be implemented with software, hardware, firmware, or any combination of software, hardware, and firmware. Unless otherwise specially stated, the foregoing sequences of operations of the methods are merely for description, and are not intended to limit the operations of the methods of the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A face anti-counterfeiting detection method, comprising:
   obtaining an image or video to be detected containing a face;
   extracting a feature of the image or video to be detected, and detecting whether the extracted feature contains counterfeited face clue information, wherein the counterfeited face clue information comprises counterfeited clue information of an imaging media, and the counterfeited clue information of the imaging media further a screen edge, screen reflection, and a screen Moiré pattern of a display device; and
   determining whether the face passes the face anti-counterfeiting detection according to a detection result.

2. The method according to claim 1, wherein the extracted feature comprises one or more of the following: a local binary pattern feature, a histogram of sparse coding feature, a panorama feature, a face map feature, and a face detail map feature; or
   wherein the counterfeited face clue information has human eye observability under a visible light condition; or
   wherein the counterfeited face clue information further comprises at least one of the following: counterfeited clue information of an imaging medium, or clue information of a real counterfeited face; and
   wherein the counterfeited clue information of the imaging medium comprises at least one of: edge information, reflection information, or material information of the imaging medium; or
   wherein the clue information of the real counterfeited face comprises at least one of: the characteristics of a masked face, the characteristics of a model face, or the characteristics of a sculpture face.

3. The method according to claim 1, wherein the extracting a feature of the image or video to be detected, and detecting whether the extracted feature contains counterfeited face clue information comprise:
   inputting the image or video to be detected to a neural network, and outputting, by the neural network, a detection result for indicating whether the image or video to be detected contains at least one piece of counterfeited face clue information, wherein the neural network is pre-trained based on a training image set containing the counterfeited face clue information.

4. The method according to claim 3, wherein the training image set comprises a plurality of facial images serving as positive samples for training and a plurality of images serving as negative samples for training;
   the training image set containing the counterfeited face clue information is obtained by the following operations:
   obtaining the plurality of facial images serving as positive samples for training; and
   performing image processing for simulating the counterfeited face clue information on at least a part of the obtained at least one facial image to generate at least one image serving as a negative sample for training.

5. The method according to claim 1, wherein the obtaining an image or video to be detected containing a face comprises:
   obtaining, by a visible light camera of a terminal device, the image or video to be detected containing a face.

6. The method according to claim 3, wherein the neural network comprises a first neural network located in the terminal device;

the determining whether the face passes the face anti-counterfeiting detection according to a detection result comprises: determining, by the terminal device, whether the face passes the face anti-counterfeiting detection according to a detection result output by the first neural network.

7. The method according to claim 1, wherein the obtaining an image or video to be detected containing a face comprises:
receiving, by a server, the image or video to be detected containing a face sent by the terminal device.

8. The method according to claim 3, wherein the neural network comprises a second neural network located in the server, wherein the determining whether the image or video to be detected passes the face anti-counterfeiting detection according to a detection result comprises: determining, by the server, whether the face passes the face anti-counterfeiting detection according to a detection result output by the second neural network, and returning to the terminal device a determination result about whether the face passes the face anti-counterfeiting detection.

9. The method according to claim 8, wherein the neural network further comprises a first neural network located in the terminal device, and a size of the first neural network is less than a size of the second neural network;
the method further comprises:
inputting a video containing a face obtained by the terminal device to the first neural network, and outputting, by the first neural network, a detection result for indicating whether the video containing a face contains at least one piece of counterfeited face clue information; and
in response to the detection result indicating that the video containing a face does not contain the counterfeited face clue information, selecting a partial video or image from the video containing a face as the image or video to be detected to be sent to the server.

10. The method according to claim 9, wherein the selecting a partial video or image from the video containing a face as the image or video to be detected to be sent to the server comprises:
obtaining a status of a network currently used by the terminal device; and at least one of the following operations:
if the status of the network currently used by the terminal device satisfies a first preset condition, selecting a partial video from the video obtained by the terminal device as the video to be detected to be sent to the server; or
if the status of the network currently used by the terminal device does not satisfy the first preset condition, but the status of the network currently used by the terminal device satisfies a second preset condition, selecting at least one image that satisfies a preset standard from the video obtained by the terminal device as the image to be detected to be sent to the server.

11. The method according to claim 10, wherein when selecting a partial video from the video obtained by the terminal device as the video to be detected to be sent to the server, inputting the video to be detected to the second neural network, and outputting, by the second neural network, a detection result for indicating whether the video to be detected contains at least one piece of counterfeited face clue information, comprising:
selecting, by the server, at least one image from the video to be detected as the image to be detected to be input to the second neural network, and outputting, by the second neural network, a detection result for indicating whether the image to be detected contains at least one piece of counterfeited face clue information.

12. The method according to claim 9, wherein in response to the detection result indicates that the video containing a face contains at least one piece of counterfeited face clue information, the determining whether the face passes the face anti-counterfeiting detection according to a detection result comprises: determining, by the terminal device, that the face fails to pass the face anti-counterfeiting detection according to the detection result output by the first neural network.

13. The method according to claim 9, further comprising: returning, by the server, the detection result output by the second neural network to the terminal device;
the determining whether the face passes the face anti-counterfeiting detection according to a detection result comprises: determining, by the terminal device, whether the face passes the face anti-counterfeiting detection according to the detection result output by the second neural network.

14. The method according to claim 9, wherein the determining whether the face passes the face anti-counterfeiting detection according to a detection result comprises: determining, by the server, whether the face passes the face anti-counterfeiting detection according to the detection result output by the second neural network, and sending to the terminal device a determination result about whether the face passes the face anti-counterfeiting detection.

15. The method according to claim 3, further comprising:
performing, by the neural network, living body detection on the video obtained by the terminal device; and
in response to passing the living body detection by the video obtained by the terminal device, executing the face anti-counterfeiting detection method according to claim 3.

16. The method according to claim 15, the performing, by the neural network, living body detection on the video obtained by the terminal device comprises: performing, by the first neural network, the living body detection on the video obtained by the terminal device;
the in response to passing the living body detection by the video obtained by the terminal device, executing the face anti-counterfeiting detection method according to claim 3 comprises:
in response to passing the living body detection by the video obtained by the terminal device, executing the operations of inputting the video obtained by the terminal device to the first neural network, and extracting, by the first neural network, a feature of the video obtained by the terminal device and detecting whether the extracted feature contains counterfeited face clue information; or
in response to passing the living body detection by the video obtained by the terminal device, selecting a partial video or image from the video obtained by the terminal device as the image or video to be detected, and executing the operations of inputting the image or video to be detected to a neural network, and outputting, by the neural network, a detection result for indicating whether the image or video to be detected contains at least one piece of counterfeited face clue information.

17. The method according to claim 15, wherein the performing, by the neural network, living body detection on the video obtained by the terminal device comprises:

performing, by the neural network, validity detection of a required action on the video obtained by the terminal device; and at least in response to that a validity detection result indicates the required action satisfies a preset condition, determining that the video obtained by the terminal device passes the living body detection.

18. The method according to claim 17, wherein the required action comprises at least one of the following: blink, open mouth, shut up, smile, nod up, nod down, turn left, turn right, tilt left, tilt right, head down, or head up, wherein the required action is a preset required action or a randomly selected required action.

19. An electronic device, comprising:

memory configured to store executable instructions; and a processor configured to communicate with the memory to execute the executable instructions so as to perform:

obtaining an image or video to be detected containing a face;

extracting a feature of the image or video to be detected, and detecting whether the extracted feature contains counterfeited face clue information, wherein the counterfeited face clue information comprises counterfeited clue information of an imaging media, and the counterfeited clue information of the imaging media comprises a screen edge, screen reflection, and a screen Moiré pattern of a display device; and determining whether the face passes the face anti-counterfeiting detection according to a detection result.

20. A non-transitory computer-readable storage medium configured to store computer-readable instructions, wherein execution of the instructions by the processor causes the processor to perform:

obtaining an image or video to be detected containing a face;

extracting a feature of the image or video to be detected, and detecting whether the extracted feature contains counterfeited face clue information, wherein the counterfeited face clue information comprises counterfeited clue information of an imaging media, and the counterfeited clue information of the imaging media comprises a screen edge, screen reflection, and a screen Moiré pattern of a display device; and determining whether the face passes the face anti-counterfeiting detection according to a detection result.

* * * * *